United States Patent Office 2,834,679
Patented May 13, 1958

2,834,679

PREPARATION OF FLAVORED MILK DRINKS

Leonard S. Stoloff, New Bedford, Mass., assignor to Seaplant Chemical Corporation, New Bedford, Mass., a corporation of Delaware No Drawing. Application January 28, 1955
Serial No. 484,839

5 Claims. (Cl. 99—54)

This invention relates generally to the manufacture of flavored milk beverages and more particularly to a method of producing a milk drink flavored with flavoring material which is carried in the drink as a suspension of fine particles.

In the manufacture of chocolate flavored milk various methods have heretofore been employed to stabilize the drink; that is, to prevent the settling out of the cocoa which is in the chocolate milk drink in the form of small particles. If some form of stabilizer is not used the cocoa particles settle out and this is not desired. Hence, some method is employed to prevent the settling out of the cocoa. Extractive of Irish moss has been heretofore used in various ways as a stabilizer for chocolate milk drinks. In some methods the stabilizer and flavoring are added simultaneously to the milk either in the form of a powder or in the form of a syrup, the mixture of flavoring, stabilizer and milk then being pasteurized by heating. After pasteurization the chocolate drink is then cooled and put in containers for distribution to the ultimate consumer. In another method the chocolate flavoring and stabilizer in the form of a syrup are added to cold milk (raw or pasteurized) but the drink is not thereafter heated. In this method if the mixture is not heated the chocolate flavoring must contain in solution, as in a syrup, a special extractive known in the trade as "cold mix stabilizer." When the usual Irish moss extractives, known as "hot mix stabilizers," are employed pasteurization or heating of the flavoring mixture containing stabilizer with the milk and subsequent cooling are required to obtain the necessary system, which holds the cocoa particles in suspension. Under these circumstances the curd structure of the milk is influenced by the flavoring employed, sometimes adversely. Completely unusuable under these circumstances are acedic flavors such as fresh crushed fruit having acidic characteristics such as strawberry. Heat sensitive flavors are impaired. Moreover, the quantity and type of flavored milk drink required by the manufacturer (usually a dairy) for the day's operations must be known by the dairy prior to operation of the pasteurizer. Furthermore, variations in the flavoring strength of the milk must be accompanied by alterations in the stabilizer content of the flavoring composition.

This invention provides a method of manufacturing milk drinks flavored with flavoring of the type that remains in the drink as small particles, such as chocolate flavoring or certain crushed fruit type flavorings and in which it is desired that the particles do not settle out but remain suspended and stabilized in the drink, and at the same time the difficulties and drawbacks of prior known methods are overcome.

I have found that if the Irish moss extractive ordinarily used for "hot mix" stabilization of the chocolate milk drink is added to the milk by itself without the sugar and cocoa required for flavoring, and the milk containing the extractive is pasteurized and cooled according to the normal procedures for preparing pasteurized milk, the flavoring ingredients may be added to the milk at any subsequent time, even after cooling the milk, with a resulting drink as good as, or better in all respects than the drink produced in which the flavoring was present during the pasteurizing process. In my method, the sugar and cocoa may be added to the stabilized milk as a powder or the cocoa and sugar may be added to the stabilized milk as a syrup which may be made by heating the cocoa and sugar in an aqueous medium to form a chocolate syrup. Crushed and macerated fruits may be added mixed with granulated sugar or as syrup.

The method of my invention has important advantages. Stabilized milk prepared by stabilizing it by the addition of Irish moss extractive alone to the milk and pasteurizing the mixture, does not show a butter fat separation, and in this respect it is similar to homogenized milk. Thus, if an excess of stabilized milk beyond that required for the day's demand of chocolate flavored drink has been prepared, this milk can be used as a homogenized type of milk. Furthermore, one batch of pasteurized stabilized milk may be used for making up orders for chocolate flavored drinks of different degrees of "chocolatiness" since some customers prefer a chocolate milk drink with a more pronounced chocolate flavor than others; or, a part of the same batch of pasteurizer stabilized milk may be used to make chocolate flavored drinks and another part may be used to make drinks having other flavors, such as crushed fruit flavors.

According to the method of my invention Irish moss extractive is added to milk without chocolate, cocoa, sugar, or any flavoring; the mixture is then pasteurized in the usual or conventional manner by heating; the heated pasteurized milk, now stabilized by the Irish moss extractive is cooled and the flavoring ingredients, such as sugar, cocoa or a sweetened chocolate syrup or other flavored and sweetened syrup, or crushed fruit flavoring, is added to the cooled stabilized milk, with the result that the flavoring ingredients, even though in the form of particles, remain suspended and stabilized in the drink.

Although the novel features which are believed to be characteristic of the invention are pointed out in the annexed claims, the invention itself as to its objects and advantages and the manner in which it may be carried out may be better understood from the following examples.

Example I

Irish moss extractive of commercial grade alone, without chocolate flavoring, or cocoa and sugar, or any flavoring was added to a quantity of 2% B. F. (butter fat) milk to produce a concentration of 0.038% extractive by weight in the milk. The milk containing the extractive was pasteurized at 150°–155° F. for 20 minutes, then cooled immediately to a temperature of 50° F. by passing it over a surface cooler. After the milk so treated and now designated as stabilized milk had been stored overnight, 100 grams of chocolate syrup (Hershey's brand) was intimately mixed with 22 ounces of the treated or stabilized milk. A similar amount of the same chocolate syrup was intermixed with a like amount of pasteurized milk to which no extractive was added. The chocolate milk drink made from the untreated milk showed heavy settling of cocoa particles within 15 minutes, whereas the chocolate drink made with the treated or stabilized milk maintained a perfect appearance without settling out of cocoa particles over a storage period of 4 days at 50° F., after which the drink was discarded.

In another series of tests, an Irish moss extractive of commercially acceptable quality (known in the trade under the tradename Seakem—Type 2) alone without chocolate flavoring, or cocoa or sugar or any flavoring, was added to a quantity of milk containing 2% butter fat. The amount of Irish moss extractive added was sufficient to produce a concentration of 0.038% extractive by weight in milk. The milk containing the extractive intermixed therewith was pasteurized at 150°–155° F. for twenty minutes, then cooled immediately to a temperature of 45° F. by passing it over a surface cooler. The milk so treated and now designated as stabilized milk was divided into a number of portions, which, for convenience, are herein designated as portions A–1, B–1, C–1, D–1, E–1. To individual portions of the stabilized milk were added flavorings in the ratios as indicated in the following examples.

Example II.—Chocolate flavoring

A commercial chocolate syrup (Hershey Brand) was added to portion A–1 of the stabilized milk in the proportion of 100 grams of syrup for each 22 fluid ounces of the stabilized milk. For comparison, a quantity of the same chocolate syrup was added in the same proportion to a portion of untreated milk from the same raw milk supply; this sample, for convenience being herein designated as portion A.

The sample A showed heavy settling of cocoa particles in fifteen minutes whereas sample A–1 the chocolate milk drink made with the stabilized milk maintained a perfect appearance without settling out of cocoa particles after a storage period of 4 days. The samples were stored at 50° F. and examined each day and discarded after 4 days.

Example III.—Chocolate flavoring

A chocolate flavoring was prepared by mixing 400 grams of sugar, 139 grams of cocoa and 265 ml. of water, heating the mixture to 190° F. and holding it at that temperature for 10 minutes, then cooling and replacing water lost by evaporation. The chocolate syrup thus prepared was intermixed with portion B–1 of the stabilized milk in the proportion of 100 grams of syrup for each 22 fluid ounces of stabilized milk. For comparison, a quantity of this prepared chocolate syrup was added in the same proportion to a portion of untreated milk from the same supply, this sample for convenience being herein designated as portion B.

Sample B showed heavy settling out of cocoa particles after 15 minutes whereas the sample B–1, the chocolate milk drink made with the stabilized milk, maintained the cocoa in suspension without settling out even after 4 days' storage. The samples were stored at 50° F., examined each day and discarded after 4 days.

Sample B–1 showed no butter fat separation whereas sample B showed butter fat separation.

Example IV.—Strawberry flavoring

A strawberry flavoring was prepared by mixing a commercial 4+1 pack of frozen sliced strawberries with half its weight of sugar and passing this mixture through a colloid mill adjusted to a clearance of 0.002 inch. The resulting syrup was added to portion C–1 of the stabilized milk by mixing it therewith in the proportion of 100 grams of syrup to 22 fluid ounces of the stabilized milk. For comparison, a quantity of this prepared strawberry flavoring was added in the same proportion to a portion of untreated milk from the same supply and this sample is herein designated as C. The results are set forth hereinafter.

Example V.—Raspberry flavoring

A raspberry flavoring was prepared by mixing a commercial 4+1 pack of frozen, whole raspberries with half its weight of sugar and passing this mixture through a colloid mill adjusted to a clearance of 0.002 inch. The resulting syrup was added to portion D–1 of the stabilized milk in the proportion of 100 grams of syrup to 22 fluid ounces of the stabilized milk. For comparison, a quantity of this prepared raspberry flavoring was added in the same proportion to a portion of untreated milk from the same supply and this sample is herein designated as D. The results are set forth hereinafter.

Example VI.—Date flavoring

A date flavoring was prepared by passing whole, pitted dates through a colloid mill adjusted to a clearance of 0.002 inch. The resulting paste was used to flavor portion E–1 of the stabilized milk by adding it to the proportion of 60 grams of the date paste to 22 fluid ounces of the stabilized milk. For comparison, a quantity of this date paste was added in the same proportion to a portion of untreated milk from the same supply and this sample is herein designated as E. The results are set forth hereinafter.

In all the foregoing examples, II to VI, the flavorings were mixed with the milk by stirring gently with a spatula for approximately 30 seconds. The flavored milk samples were stored overnight at 50° F. and examined the next day. All of the flavored milk prepared with the stabilized milk (samples A–1, B–1, C–1, D–1, E–1) had the flavoring uniformly distributed without settling out of the particles, they showed no cream separation, no curd and no whey. The flavor was pleasant and the pour and drinking characteristics were good. The appearance of the samples of flavored unstabilized milk (A, B, C, D, E) was markedly different. The chocolate flavored unstabilized milks (A, B) showed heavy settling of cocoa particles. The fruit pulp in the stabilized milk drinks (C–1, D–1, E–1) remained perfectly suspended and there was no butter fat separation. The fruit pulp in the unstabilized milks (C, D, E) had concentrated at the top of the bottles in which they were contained and the fruit pulp was mixed with striations of butter fat that had risen. The appearance of these flavored milks was very unappetizing and they required shaking to obtain favorable drinking characteristics.

Example VII

Irish moss extractive of the type sold to the trade under the tradename Seakem Type 2 was intermixed with raw milk having a 4% butterfat content, the mixture was pasteurized at 150°–155° F. for twenty minutes, then cooled. The amount of extractive added was sufficient to produce a concentration of 0.038% of extractive by weight of the milk. To a portion of the cooled stabilized milk was added and intermixed a chocolate flavoring as described above in Example II in the proportion of 100 grams of chocolate syrup to 22 fluid ounces of stabilized milk. For comparison a like sample was prepared except that untreated milk from the same supply was used. The cocoa in the stabilized milk remained perfectly suspended for a storage period of 4 days, whereas the cocoa in the sample of untreated milk showed settling within fifteen minutes. There was no butterfat separation in either the stabilized unflavored milk or in the stabilized flavored milk after 4 days storage under refrigeration of 50° F. whereas the untreated flavored milk and the untreated unflavored milk from the same supply showed butterfat separation.

Example VIII

A chocolate flavored drink was prepared as described in Example I except that the amount of Irish moss extractive used produced a concentration of 0.035% by weight of the milk. The cocoa in this sample remained perfectly suspended after a storage period of 4 days.

Example IX

A chocolate flavored drink was prepared as described in Example I except that the amount of Irish moss extractive used produced a concentration of 0.042% by weight of the milk. After a storage period of four days under like conditions as in Example I, the cocoa particles remained perfectly suspended and there was no butterfat separation. However, the extractive stabilizer showed a tendency toward gelation as observed when the flavored milk drink was poured and there was some evidence of curd on the side of the bottle when the liquid drained away.

In my experience in handling and working with Irish moss extractives I have observed that they may vary as to strength or ability to modify milk proteins and the extent of the modification produced in the milk proteins is a function of extractive concentration, extractive strength, temperatures to which the milk is subjected, length of time for which the milk is subjected to these temperatures, and the degree of agitation to which the milk is subjected after cooling. The degree of modification should be controlled closely to give the most desirable results. If the proteins are insufficiently modified the solid particles of flavoring added to the milk will not remain suspended. If modification of the proteins is carried too far, curd and whey separation and gelation of the milk will result. I have set forth by way of examples the conditions which will give the desired results but it may be found in some instances under varying conditions that the amount of Irish moss that will effect the desired results may be as low as 0.01% in instances of specially prepared high strength extractives and in instances of low strength extractives the amount of extractive added may be as high as 0.1% or even higher in cases where the extractive has been degraded which has the effect of dilution. Economic factors will normally dictate the use of only that amount which will produce the desired end. I have set forth by way of examples procedures which may be successfully and economically employed by the dairy with present available standard equipment.

The amount of flavoring that may be added to the milk after it is stabilized and cooled according to the invention may vary over a wide range to suit individual tastes.

If only part of the advantages accruing from my invention is desired, any part of all of the sugar and even a part of the flavor may be included with the Irish moss extractive during the pasteurizing part of the process.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. A method of producing a flavored milk drink which is flavored by a flavoring ingredient, a portion of which is in the form of fine particles, which comprises adding at least 0.01% but not more than 0.01% by weight of Irish moss extractive to the milk, heating the mixture of extractive and milk without added flavoring ingredients at a temperature and for sufficient time to adequately modify the proteins in the milk and to pasteurize it, then cooling the milk, thereby forming a stabilized milk, and thereafter adding to the stabilized milk a flavoring ingredient a portion of which is in the form of discrete fine particles.

2. A method of producing a flavored milk drink which is flavored by a flavoring ingredient, a portion of which is in the form of fine particles, which comprises adding at least 0.01% but not more than 0.1% by weight of Irish moss extractive to the milk, heating the mixture of extractive and milk without added flavoring ingredients at a temperature and for sufficient time to adequately modify the proteins in the milk and to pasteurize it, then cooling the milk, thereby forming a stabilized milk, and thereafter adding to the stabilized milk a flavoring ingredient, a portion of which is in the form of discrete particles, selected from the class consisting of chocolate flavoring containing cocoa particles and fruit flavoring containing fine particles of crushed fruit.

3. A method of producing a flavored milk drink which is flavored by a flavoring ingredient, a portion of which is in the form of fine particles, which comprises adding to milk at least 0.01% but not more than 0.1% Irish moss extractive based on the weight of the milk, pasteurizing the mixture of extractive and milk without added flavoring at a temperature from 150° to 155° F. for sufficient time to modify the proteins in the milk, cooling the milk to about 50° F., thereby forming a stabilized milk, and thereafter adding to the stabilized milk a flavoring ingredient, a part of which is in the form of fine particles.

4. A method of producing a flavored milk drink which is flavored by a flavoring ingredient a portion of which is in the form of fine particles which comprises adding to milk from 0.01% to 0.1% Irish moss extractive based on the weight of the milk, pasteurizing the mixture of extractive and milk without added flavoring at a temperature from 150° to 155° F. for sufficient time to modify the proteins in the milk, cooling the milk to about 50° F., thereby forming a stabilized milk, and thereafter adding to the stabilized milk a flavoring ingredient a part of which is in the form of fine particles, selected from the class consisting of chocolate flavoring containing cocoa particles and fruit flavoring containing crushed fruit in the form of fine particles.

5. A method of producing a flavored milk drink which is flavored by a flavoring ingredient a portion of which is in the form of fine particles which comprises adding to milk sufficient Irish moss extractive to produce a concentration of about 0.038% extractive in the milk, pasteurizing the mixture of extractive and milk without added flavoring at a temperature from 150° to 155° F. for sufficient time to modify the proteins in the milk, thereby forming a stabilized milk, cooling the stabilized milk to about 50° F. and thereafter ading to the stabilized milk a flavoring ingredient a part of which is in the form of fine particles, selected from the class consisting of chocolate flavoring containing cocoa particles and uncooked fruit flavoring containing fine particles of crushed fruit.

References Cited in the file of this patent

UNITED STATES PATENTS

| | | |
|---|---|---|
| 113,562 | Rand | Apr. 11, 1871 |
| 128,248 | Rand | June 25, 1872 |
| 1,710,504 | North | Apr. 23, 1929 |
| 2,011,594 | Seltzer | Aug. 20, 1935 |

UNITED STATES PATENT OFFICE
CERTIFICATE OF CORRECTION

Patent No. 2,834,679                                                    May 13, 1958

Leonard S. Stoloff

It is hereby certified that error appears in the printed specification of the above numbered patent requiring correction and that the said Letters Patent should read as corrected below.

Column 1, line 51, for "acedic" read -- acidic --; column 2, lines 27 and 28, for "pasteurizer" read -- pasteurized --; column 5, line 54, for "0.01%", second occurrence, read -- 0.1% --.

Signed and sealed this 22nd day of July 1958.

(SEAL)
Attest:
KARL H. AXLINE

Attesting Officer

ROBERT C. WATSON
Commissioner of Patents